United States Patent [19]
Keenan

[11] 4,084,853
[45] Apr. 18, 1978

[54] HOPPER DEVICE FOR TRACTOR VEHICLES

[75] Inventor: Richard Keenan, Walcott, Bagenalstown, County Carlow, Ireland

[73] Assignees: Richard Keenan; Patrick Keenan; John Keenan, Ireland; part interest to each

[21] Appl. No.: 660,795

[22] Filed: Feb. 24, 1976

[30] Foreign Application Priority Data

Feb. 24, 1975 Ireland .................................. 381/75

[51] Int. Cl.² .............................................. E02F 5/00
[52] U.S. Cl. .................... 298/24; 214/83.32; 214/140; 214/766; 214/778
[58] Field of Search ............................. 298/17 R, 24; 214/701 R, 701 P, 83.32, 78, 140, 766, 778, 779

[56] References Cited

U.S. PATENT DOCUMENTS

| 2,743,828 | 5/1956 | Hayes | 214/78 |
| 3,155,253 | 11/1964 | Pilch | 214/778 X |
| 3,521,719 | 7/1970 | Forpahl | 214/78 X |

FOREIGN PATENT DOCUMENTS

| 76,876 | 12/1953 | Denmark | 214/766 |
| 729,416 | 5/1955 | United Kingdom | 214/766 |

Primary Examiner—Drayton E. Hoffman
Assistant Examiner—George F. Abraham
Attorney, Agent, or Firm—Young & Thompson

[57] ABSTRACT

A hopper is adapted to be mounted on the three-point suspension system of an agricultural tractor by pivoting the lifting links to pivots immediately beneath the hopper body which has downwardly extending arms to which are pivoted a link pivotally connecting same to the anchor pin from which the usual stabilizing link of the tractor is removed. This construction gives a four-bar chain with crossed links whereby the hopper may be raised from a horizontal position to an upright position (or vice versa) by operating the lifting links. The construction is also capable of adjustment. The contents of the hopper can be discharged in bulk or dispensed laterally by an archimedean screw located in the bottom of the hopper.

8 Claims, 4 Drawing Figures

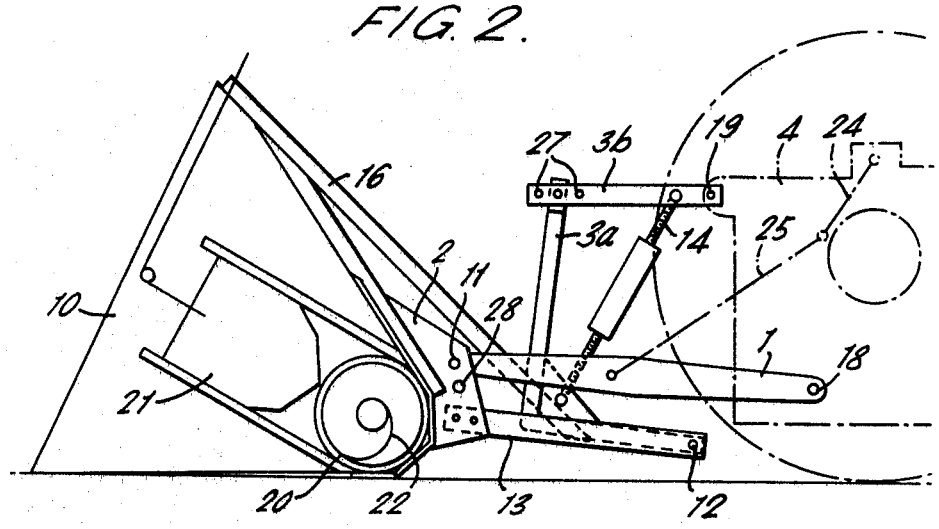
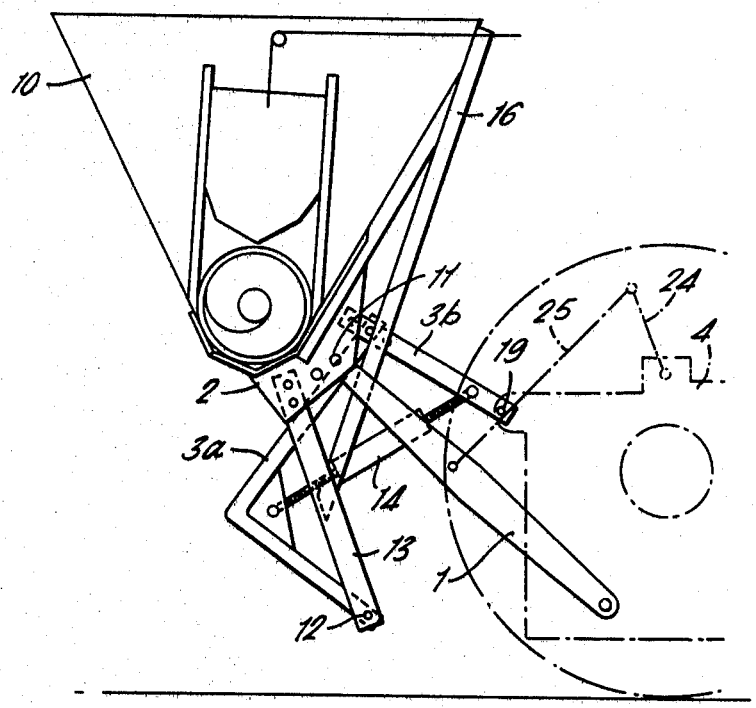

HOPPER DEVICE FOR TRACTOR VEHICLES

BACKGROUND OF THE INVENTION

This invention concerns hopper devices for mounting on tractor vehicles of the type commonly used for agricultural purposes and furnished with a so-called "three-point suspension" for mounting tools behind the tractors and comprising a pair of hydraulically operated lifting links which extend rearwardly, usually from pivots located below the rear axle, and an upper stabilising link pivoted to an anchor pin above the rear axle.

The present invention has for its object to provide a simple mechanism by which a hopper may be mounted on such a tractor vehicle and may be readily moved from a substantially upright position (its normal carrying position) into a substantially horizontal position, in which latter position it may be used in the manner of a digger bucket to take up a charge of friable material from a heap of such matter, after which the hopper with its load of material may be returned into the upright position and transported by the tractor to the place where it is required for use. The contents of the hopper may be discharged either in bulk by returning the hopper to its substantially horizontal position or gradually by operating a dispensing device driven from the tractor.

SUMMARY OF THE INVENTION

With the foregoing in view the invention provides means for mounting the hopper on a tractor vehicle of the type referred to comprising a pivot in the region of the bottom of the hopper for the pivotal attachment of each of the lower lifting links of the tractor, a second pivot on an arm extending downwardly from the bottom of the hopper and a connecting link to provide a pivotal connection between said second pivot and an anchor point on the body of the tractor vehicle, whereby the tractor vehicle and the hopper are adapted to form two opposite links of a four-bar chain with crossed links dimensioned so that in one position of the lifting links of the tractor the hopper may be lowered into a substantially horizontal position, while enabling the hopper to be raised and turned from this position into a substantially upright position by upward movement of the lifting links.

Preferably the connecting link consists of two portions pivotally connected together so as to be relatively adjustable angularly, and means are provided for adjusting the distance apart of the pivot points at opposite ends of said connecting link. The adjustment in question may be effected by a brace of adjustable length extending diagonally between the two portions of the connecting link. At least one of the two portions of the connecting link may also be adjustable in its effective length. A further degree of adjustment may be afforded, for example, by providing an alternative point of attachment of the lifting links to the hopper body.

Advantageously the hopper is provided at the bottom with a lateral outlet having a sliding shutter door and preferably a feed screw or worm is mounted in the hopper adjacent to the outlet and adapted to be drivably connected to the power take-off drive of the tractor in accordance with well known practice in relation to tractor-mounted tools which are required to be driven by the tractor.

THE DRAWINGS

In the accompanying drawings:

FIG. 2 is a side elevation showing the hopper in its lowered position when mounted on a tractor vehicle;

FIG. 3 is a similar view showing the hopper in its raised position; and

THE PREFERRED EMBODIMENT

Figure 1:
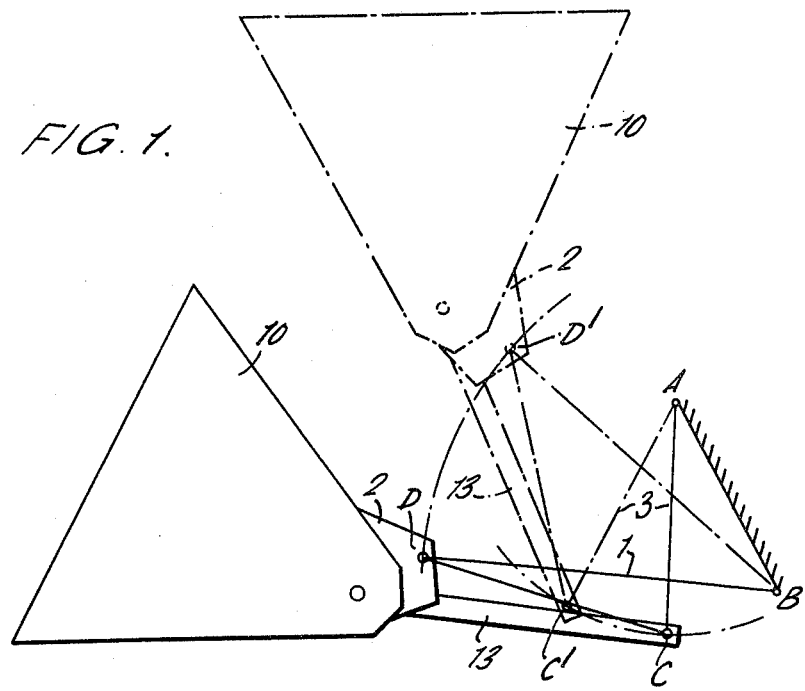
FIG. 1 is a diagram illustrating the principle underlying the invention.

In the diagrammatic representation shown in FIG. 1, the hopper 10 is shown in the lowered position in full lines, and in the raised position in broken lines. The link mechanism provided according to the invention is similarly shown in full lines in the lowered position and in broken lines in the raised position. B represents the point on the tractor to which one end of the lower lifting link 1 is pivoted, while A is the point on the tractor to which the stabilising link is usually pivoted, but in carrying out the invention the stabilising link is removed and in its place a connecting link 3 extends between A and the pivot point C near the extremity of an arm 13 extending downwards from the body of the hopper 10. A gusset plate 2 on the bottom of the hopper body provides a pivot point D for the free end of the lifting link 1. The mechanism thus provides a four-bar chain with crossed links AC and BD, while the link AB is constituted by the tractor body, and the link CD by the hopper with its downwardly extending arm. The dimensions of the links are chosen so that when moved from the position shown in full lines to the position shown in broken lines, i.e. by raising the end D of the lifting link through a relatively small angle to the position marked D', while C simultaneously moves to C', the hopper is moved through a greater angle from a horizontal position into an upright position. Advantageously the lifting link 1 moves through an angle of about 35°, while the hopper arm 13 moves through about 60° relatively to the tractor vehicle. Provision may be made, however, for some adjustment as is hereinafter described, to enable the position of the hopper to be adjusted according to requirements.

Figure 4:
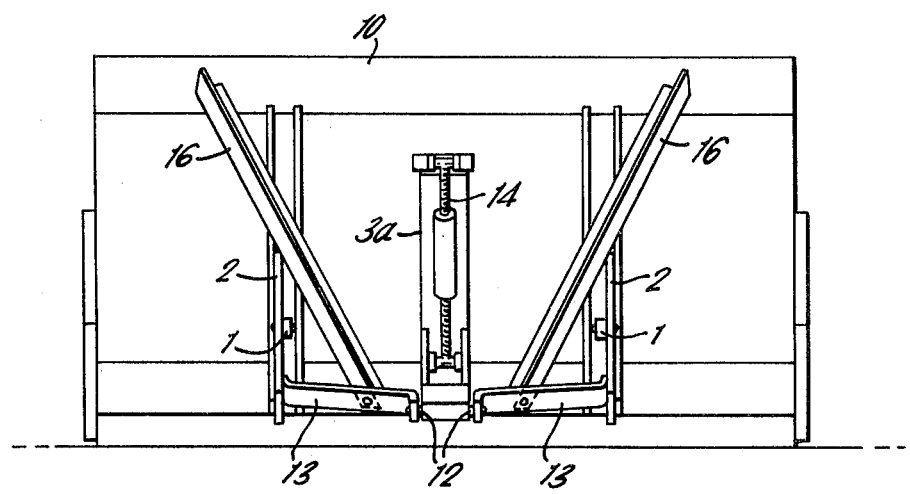
FIG. 4 is an end elevation corresponding to FIG. 2.

Referring now to FIGS. 2 to 4, where the link means according to the invention is shown in a practical form, the tractor on which the hopper 10 is mounted is represented diagrammatically in outline by broken lines 4. The tractor provides in customary manner a pivot 18 for the lifting link 1, and an anchor pin 19, which normally forms a pivot for one end of the stabilising link. The latter is here dispensed with and replaced by a connecting link 3a, 3b, the two portions 3a and 3b of which are relatively angularly disposed and connected by a diagonal brace 14 which is adjustable in length. For this purpose the opposite ends of the brace 14 are oppositely screw-threaded and engage a correspondingly threaded muff by turning which in one or other direction the brace may be lengthened or shortened as desired.

The hopper 10 has web plates 2, 2 welded to one side near the bottom. Said plates which may be considered as providing in conjunction with the downwardly extending arm 13, rigidly supported by stay 16, the second member of the link mechanism abovementioned, affording pivot points 11, 12 to which are pivoted respectively the free ends of the lower links 1 of the tractor three-point lifting system and the toe of the portion of the connecting link 3a which is L-shaped and together with the bar portion 3b forms the third member of the link mechanism.

As is evident from FIG. 3 the arms 13 are duplicated and curve inwards to connect with the centrally located link portion 3a so that the hopper 10 is symmetrically supported by a link 1 at each side and the connecting link 3a, 3b together with brace 14 disposed midway between them.

It will be seen by comparison of FIGS. 2 and 3 that merely by moving the links 1, which may be readily brought about in known manner by operating the hydraulic crank arms (indicated by broken lines 24) which are normally provided on the tractor and are connected to the lifting links 1 by links indicated by broken lines 25, the hopper 10 may be moved from a substantially horizontal position (FIG. 2) to an upright position (FIG. 3).

While the provision of the adjustable brace 14 enables some adjustment of the position of the hopper 10 to be effected, since it has the effect of permitting the length of the link AC in FIG. 1 to be adjusted, it may also be desirable to provide further means of adjustment. For example, the link portion 3b may be provided with a number of pivot points 27 (FIG. 2) any selected one of which may be used for connecting together the two portions 3a and 3b of the connecting link, while a pivot point 28 additional to the pivot point 11 may be provided in the web plates 2, thus enabling the point of attachment thereto of the lifting links 1 to be changed if desired.

The hopper 10 may be caused to take up a charge of friable material (e.g. grain from a heap of such material) by moving the tractor rearwardly with the hopper in the position shown in FIG. 2 so that the hopper will dig into the heap, whereafter the hopper charged with a quantity of the material may be raised into the position shown in FIG. 3.

The hopper 10 advantageously has a lateral outlet 20 obturated by a sliding shutter 21, a worm 22 drivably connected in any convenient manner to the power take-off shaft of the tractor (not shown) being also provided in association with the outlet 20 to enable the contents of the hopper to be dispensed when required.

The individual members of the link mechanism according to the invention may obviously be modified in detail without departing from the invention.

I claim:

1. The combination of a tractor vehicle and a hopper mounted on the tractor vehicle, said hopper having a plurality of sides and a bottom and movable from a lower position to a raised position, a pair of lifting links pivoted on a portion of the tractor vehicle below the rear axle thereof the tractor having an upper anchorage point thereon above said axle, a pivot in the region of the bottom of the hopper for the pivotal attachment of each lifting link to the hopper, an arm extending downwardly below the bottom of the hopper in said raised position, a pivot bearing on said arm spaced from the hopper bottom and a connecting link extending downward below said lifting links to provide a pivotal connection between said pivot bearing and said upper anchorage point on the tractor vehicle.

2. A hopper as claimed in claim 1, wherein the connecting link comprises two portions adjustably connected together.

3. A hopper as claimed in claim 1, wherein the connecting link consists of two portions pivotally connected together and held in adjustable angular relation by a diagonal brace, with means for adjusting the length of the brace to vary the angle between the two portions of the connecting link.

4. A hopper as claimed in claim 1, wherein the connecting link consists of two portions pivotally connected together and held in angular relation by a diagonal brace, the effective length of at least one of said link portions being adjustable relatively to the other link.

5. A hopper as claimed in claim 1, wherein the connecting link comprises an L-shaped portion adjustably connected to a bar portion and angularly disposed in relation thereto at the point of connection.

6. Structure as claimed in claim 1, said pivot of said lifting links to the hopper being disposed above said arm.

7. Structure as claimed in claim 6, said pivot of said lifting links to said hopper being spaced from said arm.

8. Structure as claimed in claim 1, the projections of said lifting links and connecting link on a plane perpendicular to said pivot intersecting each other.

* * * * *